United States Patent [19]
Boschetti et al.

[11] 3,888,993
[45] June 10, 1975

[54] PHARMACEUTICAL COMPOSITION CONTAINING AMINO ALCOHOLS DERIVED FROM ORTHO-TRANS-HYDROXYCINNAMIC ACIDS, THEIR ESTERS AND THEIR AMIDES

[75] Inventors: Eugene Boschetti, Venissieux; Darius Molho, Boulogne-Sur-Seine; Louis Fontaine, Lyon, all of France

[73] Assignee: Lipha, Lyonnaise Industrielle Pharmaceutique, Lyon, France

[22] Filed: May 3, 1973

[21] Appl. No.: 356,786

Related U.S. Application Data

[62] Division of Ser. No. 241,381, April 5, 1972, Pat. No. 3,828,095.

[30] Foreign Application Priority Data

Apr. 9, 1971 France .............................. 71.12.668

[52] U.S. Cl. ............................... 424/309; 424/319
[51] Int. Cl. .............................................. A61k 27/00
[58] Field of Search ........................... 424/309, 319

[56] References Cited
OTHER PUBLICATIONS
Finar, IR, Organic Chem., Vol. I, 1963, Pub. by Richard Clay & Co. Ltd., Great Britain, pp. 191, 193+252.

*Primary Examiner*—Jerome D. Goldberg
*Attorney, Agent, or Firm*—Browdy & Neimark

[57] ABSTRACT

Pharmaceutical compositions which contain as active principle a compound represented by the formula

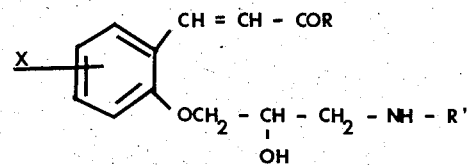

in which R is an optionally substituted hydroxy, alkoxy or amino radical, R' is a branched alkyl radical and X is hydrogen or a halogen. The compositions have a strong blocking activity on the β-sympathetic receptors in man, particularly in the treatment of chest angina and tachyarrhythmia.

14 Claims, No Drawings

PHARMACEUTICAL COMPOSITION CONTAINING AMINO ALCOHOLS DERIVED FROM ORTHO-TRANS-HYDROXYCINNAMIC ACIDS, THEIR ESTERS AND THEIR AMIDES

This is a division of application Ser. No. 241,381, filed Apr. 5, 1972, now U.S. Pat. No. 3,828,095.

The present invention relates to new derivatives of ortho-hydroxycinnamic acids and more particularly the aminoalcoholic ethers of these derivatives, the processes for their preparation and their applications. It is also concerned with obtaining intermediate products in the synthesis of certain new aminoalcoholic ethers.

The aminoalcohols of the invention can be used in chemical synthesis as intermediate products. Moreover, certain of these new compounds have a strong blocking activity on the β-sympathetic receptors in man, particularly in the treatment of chest angina and tachyarrhythmia.

The compounds forming the subject of the present invention are represented by the formula (I)

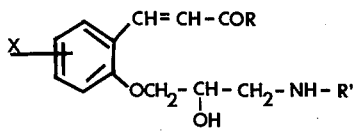

in which R is an optionally substituted hydroxy, alkoxy or amino radical, preferably a substituted aminoalkoxy radical, or guanidino radical: R' is a branched alkyl radical: X is hydrogen or a halogen.

Study of the N.M.R. shows that all the compounds are "trans" derivatives.

The mineral and organic acid salts of the compounds of formula I also form the subject of the invention.

When the substituent R in formula I represents an alkoxy radical, the new compounds can be obtained, according to the invention, by reacting an amine derivative of formula $H_2N - R'$, in which R' has the same meaning as previously, with an epoxide of general formula (II)

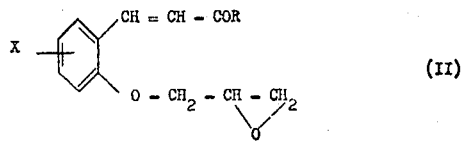

in which R is an alkoxy radical and X has the same meaning as previously. According to one preferred form, this condensation is effected with heat and reflux in a solvent.

When the substituent R in formula I represents the OH radical, the acids of formula III, in which X and R' have the same meanings as previously

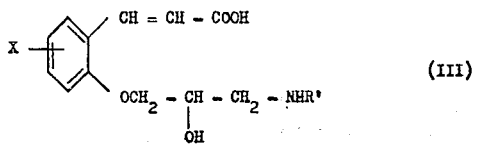

are obtained by saponifying esters represented by the formula I, when R is a lower alkoxy radical.

When the substituent R in formula I represents a substituted aminoalkoxy radical, the substituted aminoalkyl esters are obtained by condensation of the acids of formula III with the corresponding substituted haloalkylamines.

When the substituent R in formula I represents the guanidino radical, the amides are obtained by condensation of guanidine, either with the corresponding acids of formula III, or with the O-substituted hydroxycinnamic esters of formula IV

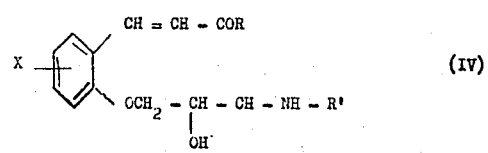

in which R is an alkoxy radical while R' and X have the same meanings as previously.

The amides can be obtained from the acids or from the O-substituted hydroxycinnamic esters.

The epoxides according to formula II are new compounds and for this reason form part of the invention. They are obtained by action of the corresponding hydroxylated cinnamic esters on epichlorhydrin in the presence of an alkali carbonate.

The methyl 5-bromo-2-hydroxy-trans-cinnamate is a new compound and forms part of the invention as synthesis intermediary. It is obtained by condensation of 6-bromocoumarine in the presence of sodium methylate in methanol.

The pharmacological efficacy of the aminoalcohols of the application was determined by different methods.

In the first method, the active substances were studied on the isolated heart of a rabbit, kept alive by the Langendorff technique. When the heart is perfused with normal Locke-Ringer solution, there are recorded two control tachycardias obtained by intra-aortic injection of a standard dose of adrenalin. The heart is then perfused with a Locke-Ringer solution containing the β-blocking product to be tested, at a certain concentration. After this perfusion has taken place for 10 minutes, the standard adrenalin injection is renewed. On the recordings obtained, there is measured the percentage of possible inhibition of the tachycardia caused by the product being studied. In this manner, the minimum active concentration is determined by starting with a maximum concentration of $5 \times 10^{-6}$, which is the minimum active concentration of "Nethalide", 2'-naphthyl-1-isopropylamino-2-ethanol hydrochloride. The second control product is "Propranolol," or 1-isopropylamino-3-(1'-naphthoxy)-2-propanol hydrochloride.

The results obtained appear in the following table. The compounds carry the number of the examples from the following experimental chemical section, relating to the aminoalcohols derived from trans-hydroxycinnamic acids, their esters and their amides.

TABLE I

| | | |
|---|---|---|
| Nethalide | $5\times10^{-6}$ | 97% |
| Propranolol | $1\times10^{-6}$ | 88% |
| Example 1 | $0.625\times10^{-6}$ | 98% |
| Example 2 | $1\times10^{-6}$ | 91% |
| Example 3 | $5\times10^{-6}$ | 65% |
| Example 4 | $5\times10^{-6}$ | 96% |
| Example 5 | $2.5\times10^{-6}$ | 90% |
| Example 6 | $0.625\times10^{-6}$ | 80% |
| Example 7 | $2.5\times10^{-6}$ (bradycardic) | 96% |
| Example 8 | $5\times10^{-6}$ | 30% |
| Example 9 | $5\times10^{-6}$ | 35% |
| Example 10 | $2.5\times10^{-6}$ | 100% |
| methyl m-(3-isopropylamino-2-hydroxy-propoxy) trans-cinnamate | inactive at $5\times10^{-6}$ | 0% |
| para-(3-isopropylamino-2-hydroxypropoxy) trans-cinnamate derivative of methyl | inactive at $5\times10^{-6}$ | 0% |

According to the second method, the tests are carried out on a cat anesthesised with "Nembutal", sodium ethyl methyl butyl barbiturate, repeated intravenous injections in a standard dose of 10γ/kg of adrenalin regularly causing comparable hypertensions of 3 to 4 cc of mercury. After intravenous injection of a sympatholytic, phentolamine methane sulphonate, in the dose of 2 mg/kg, the adrenalin injections give hypotensive responses. It is said that the sympatholytic "reverses" the adrenalin. The β-blocking products then administered to the animal are capable of restoring the hypertensive activity of the adrenalin on this preparation. All the products were tested in the standard dose of 500 micrograms per kg, applied intravenously, which is the really active dose for Propranolol. The intensity of the hypertension obtained with adrenalin was noted, immediately after injection of the β-blocking agent and the time during which the restoration of its hypertensor effect is restored.

TABLE II

| Product (No. of the examples) | Value of the 1st hypertension produced by adrenalin after β-blocking agent in cm.Hg. | Time for restoration of the adrenalic hypertension |
|---|---|---|
| Propranolol | 2.8 | 3½ hours |
| Example 1 | 3.2 | 4 hours |
| Example 2 | 2.8 | 3 hours |
| Example 3 | 2.2 | 2 hours |
| Example 4 | 2.5 | 1½ hours |
| Example 5 | 2.6 | 2½ hours |
| Example 6 | 2.8 | 3½ hours |
| Example 7 | 4.1 | 3 hours |
| Example 8 | 1.0 | 1 hour |
| Example 9 | 1.4 | ½ hour |
| Example 10 | 2.14 | 2½ hours |
| methyl m-(3-isopropyl-amino-2-hydroxypropoxy)-transcinnamate | inactive | |
| para-(3-isopropylamino-2-hydroxypropoxy)-trans-cinnamate derivative of methyl | inactive | hypotension |

As a non-limiting example, eight clinical observations concerned with the compound of Example 1, i.e. the methyl ortho-(3-isopropylamino-2-hydroxy-propoxy)-trans-cinnamate hydrochloride, or LM 748, are reported.

The pharmaceutical compositions containing, as active principle, a compound according to the invention, either in the base form, or in the form of a corresponding organic or mineral salt, can be in the form of pills, tablets, gelatine capsules, dragees, aqueous suspensions, injectable solutions, aerosols, syrups and the like. The tablets may possibly be made gastro-resistant by being lacquered with a cellulose derivative.

One tablet formula is given below as a non-limiting example:

| | |
|---|---|
| active principle | 40 mg |
| lactose | 182.5 mg |
| starch | 50 mg |
| gum arabic | 10 mg |
| alginic acid | 2.5 mg |
| potato starch | 12.5 mg |
| magnesium stearate | 2.5 mg |

These pharmaceutical compositions contain, as active principle, a compound according to the invention and a physiologically acceptable solid or liquid pharmaceutical support or diluent, permitting the daily administration of doses of active principle which are between approximately 20 mg and 1.000 mg.

Among the observations obtained in the clinical testing of the β-adrenolytic LM 748 (tablet made up to 40mg of active principle), it is possible to refer to the following eight observations:

1st observation:

Mrs. J. R., 77 years old, affected by hypothyroidism, treated with thyroid extracts, also suffers from a myxedematous cardiopathy, a pericardic discharge and a coronary insufficiency. It is a matter of reducing the tachycardia caused by the thyroid extracts. The invalid receives 3 tablets of LM 748 per day for 10 days. The rhythm passes from 90 to 75 during the treatment period. The LM 748 is very well tolerated, both at the level of general tolerance and at the clinical level. Good result.

2nd observation:

Mrs. J. L., 23 years old, suffering from Basedow disease, has a sinus tachycardia at 160. The daily dose of 3 tablets of LM 748 for 10 days reduces this tachycardia to 95 beats/minute. The medicine, which is very well tolerated, has a good bradycardic action.

3rd observation:

Mrs. Cl. B., 68 years old, suffers from a severe chest angina "angor pectoris". For 7 days, she is given 3 tablets of LM 748 per day, associated with "Trinitrine", glycerine trinitric ester (the posology of this latter passes from 4 to 0 tablets). The rhythm is maintained at 75 beats/minute. The LM 748 has the desired bradycardic effect.

4th observation:

Mr. C., 75 years old, suffering from tachyarhythmia due to auricular fibrillation developing for 3 months, is a hypertensive alcoholic, former heavy smoker (60 cigarettes per day -has not smoked for three months). Two attempts at heart manipulation were a failure. For 8 days, he receives 3 tablets a day, dosed at 40 mg, of LM 748. There is observed a good reduction in the rhythm, which changes from 120 to 80 per minute, and a lowering of the arterial tension, which falls from 18/10 to 13/7. Very good tolerance of the medicine.

5th observation:

Mr. P., 34 years old, a case of auricular flutter with irregular ventricular rhythm, totally asymptomatic, discovered three weeks before entering hospital, at home an alcoholic and smoker. After administering one tablet of LM 748 of 40 mg, three times a day, a very good tolerance is observed and also a good slowing down of the flutter waves with slowing down of the ventricular rhythm. The flutter becomes of type 4/1.

6th observation:

Mr. Cl., 77 years old, a case of complete auriculo-ventricular blockage, fitted with a fixed rhythm pacemaker (68/min), with a fixed rhythm pacemaker (68/min), with parasystolic rhythm. On the electrocardiogram, there is observed a parasystolic rhythm with spontaneous complexes with long RP and appearance of left branch blockage and electrically induced complexes. The treatment was two tablets per day. The tolerance was good and the activity very satisfactory. In fact, there were observed the disappearance of the parasystolic rhythm by slowing down the spontaneous rhythm.

7th observation:

Mr. L., 59 years old, case of 2/1 auricular flutter. An excellent result was obtained, with reduction of auricular flutter, maintenance of sinus rhythm, with three tablets of LM 748 per day.

8th observation:

Mr. B., 68 years old, case of severe chest angina, previously treated unsuccessfully with "Amiodarone" (2-butyl-4-[(2-diethylaminoethoxy)-3,5-diiodobenzoyl]-bonzofuran hydrochloride. Treatment with 1 tablet of LM 748 every 8 hours. Good result with bradycardia and considerable reduction in the taking of Trinitrine tablets (glycerine trinitric ester).

In conclusion, these eight different observations prove the efficacy and the good tolerance of the product.

Examples concerning the preparation of the new compounds and their intermediaries are given in a non-limiting manner.

EXAMPLE 1

Methyl ortho-(3-isopropylamino-2-hydroxypropoxy) trans-cinnamate:

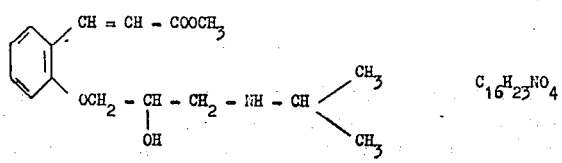

a. Preparation of the methyl ortho-(2,3-epoxypropoxy) trans-cinnamate 178 g (1 mole) of methyl ortho-hydroxy trans-cinnamate, melting at 139°C and prepared by the action of sodium methylate on coumarine Bulmann-annalen 388, 279) are placed in 1000 ml of acetone in the presence of 165.6g of anhydrous potassium carbonate and 138.7g (1.5 moles) of epichlorhydrin. This mixture is refluxed for 14 hours. The acetonic solution is filtered, the acetone is distilled and the residue is rectified. There are obtained 117 g (50%) of methyl ortho-(2,3-epoxypropoxy) trans-cinnamate:

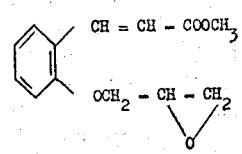

boiling at 157°C/0.25 millibar and melting at 57°C (Gallenkamp apparatus).

| Gravimetric analysis: | | |
|---|---|---|
| | $C_{13}H_{14}O_4$ | m.w. = 234.24 |
| | C % | H % |
| calculated | 66.65 | 6.02 |
| found | 66.63 | 6.00 | b. Methyl ortho-(3-isopropylamino-2-hydroxypropoxy) trans-cinnamate 234 g (1 mole) of methyl ortho-(2,3-epoxypropoxy) trans-cinnamate and 236 g (4 moles) of isopropylamine in solution in 1600 ml of isopropanol are heated under reflux for 2 hours. Evaporation to dryness takes place and a crystalline compound is obtained. After being recrystallised from hexane, the desired product melts at 93°C (Gallenkamp). The corresponding hydrochloride is obtained by the action of a stream of gaseous hydrochloric acid in a solution in chloroform of the base as previously obtained, a volume of ether is added and caused to crystallise in a refrigerator. The hydrochloride melts at 161°C (Gallenkamp) after recrystallisation from isopropanol. 270 g of hydrochloride are obtained, i.e. a yield of 82 percent.

| Gravimetric analysis: | | | |
|---|---|---|---|
| | $C_{16}H_{23}NO_4.HCl$ | m.w. = 329.81 | |
| | C % | H % | N % |
| calculated | 58.26 | 7.33 | 4.24 |
| found | 58.23 | 7.30 | 4.25 |

The NMR spectrum shows coupling constants of 16 cp for —CH=CH —, which corresponds well to a trans derivative.

EXAMPLE 2 ortho-(3-isopropylamino-2-hydroxypropoxy) trans-cinnamic acid.

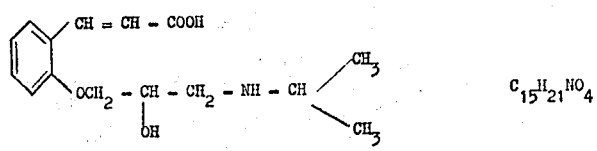

5 g of methyl ortho-(3-isopropylamino-2-hydroxypropoxy)-cinnamate, obtained according to Example 1, are placed at 95-100°C on a water bath for 1½ hours in 60 ml of normal sodium hydroxide solution. The limpid solution which is obtained is cooled and acidified to pH 2 with 5N-hydrochloric acid. This solution is evaporated to dryness under vacuum by heating on the water bath, whereafter this residue is dried, always under vacuum, to constant weight. It is taken up in 40 ml of boiling absolute ethanol and filtered. After cooling, the alcoholic solution is diluted with 3 volumes of ether and placed in a refrigerator. The hydrochloride of the ortho-(3-isopropylamino-2-hydroxypropoxy) trans-cinnamic acid, melting at 160°–162°C, is obtained with a yield of 78 percent.

| Gravimetric analysis: | | | |
|---|---|---|---|
| $C_{15}H_{21}NO_4 \cdot HCl$ | $C_{15}H_{22}ClNO_4$ | | m.w. = 315.79 |
| | C % | H % | N % |
| calculated | 57.05 | 7.02 | 4.44 |
| found | 56.83 | 7.18 | 4.52 |

EXAMPLE 3

β-diethylaminoethyl-ortho-(3-isopropylamino-2-hydroxypropoxy)-trans-cinnamate

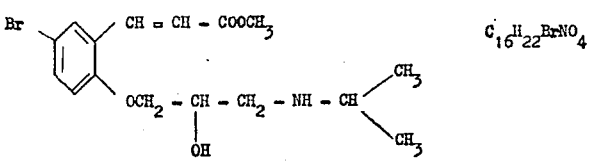

12.6 g (0.04 mole) of ortho-(3-isopropylamino-2-hydroxy-propoxy) trans-cinnamic acid hydrochloride, obtained according to Example 2, are placed in 300 ml of absolute ethanol in the presence of 4.5 g (0.08 mole) of potash. Filtration is carried out to eliminate the forming KCl, followed by evaporation to dryness. 300 ml of acetone and 5.4 g (0.04 mole) of chlorotriethylamine are added and refluxing for 5 hours takes place. The acetone is then evaporated and the oily residue is taken up in ether. This is washed with water and the ether is evaporated, the oily residue crystallising by scratching in a beaker. This is recrystallised from hexane, to obtain 4.5 g of the desired product, melting at 70°C on a Kofler bench.

| Gravimetric analysis: | | | |
|---|---|---|---|
| | $C_{21}H_{34}N_2O_4$ | | m.w. = 378.50 |
| | C % | H % | N % |
| calculated | 66.64 | 9.05 | 7.40 |
| found | 66.60 | 9.03 | 7.40 |

The corresponding oxalato is obtained within the ether. This acid dioxalate melts at 135°C (Gallenkamp) after crystallisation in the mixture of methanol and ether.

| $C_{21}H_{34}N_2O_4$ | . | $2 C_2H_2O_4$ | $C_{25}H_{38}N_2O_{12}$ | m.w. = 558.57 |
|---|---|---|---|---|
| | | C % | H % | N % |
| calculated | | 53.75 | 6.86 | 5.02 |
| found | | 53.78 | 6.89 | 5.03 |

EXAMPLE 4

Methyl-2-(3'-isopropylamino-2'-hydroxypropoxy)-5-bromo-trans-cinnamate

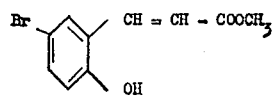

1. Preparation of the methyl 5-bromo-2-hydroxy-trans-cinnamate

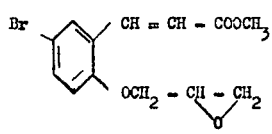

21.5 g (0.095 mole) of 6-bromocoumarine (mp = 164°C) are placed in 190 ml of anhydrous methanol in the presence of 6.5 g of anhydrous sodium methylate. Heating for 6 hours under reflux is carried out and the methanol is evaporated on a water bath under vacuum. The residue is taken up in hot water and acidified by 0.5N.HCl. The white precipitate is suction-filtered and washed with water to the point of neutrality. The product is dried and then recrystallised from benzene. The desired ester is obtained in the form of white crystals which melt at 164°C (Kofler bench).

2. Methyl-2-(2',3'-epoxypropoxy)-5-bromo-trans-cinnamate

A mixture of 7.2 g (0.028 mole) of methyl-5-bromo-2-hydroxy trans-cinnamate with 3.9 g (0.042 mole) of epichlorhydrin, 4.7 g (0.0336 mole) of anhydrous potassium carbonate and 30 ml of acetone is refluxed for 14 hours. The acetone is then evaporated under vacuum after filtration, and the residue which crystallises is taken up in a mixture of benzene and hexane. The insoluble product is eliminated and the solvents are once again evaporated under vacuum. The crystalline residue is recrystallised from hexane. There are obtained 3.8 g of the desired epoxide in the form of white crystals melting at 55°C on the Kofler bench.

3. Methyl-2-(3'-isopropylamino-2'-hydroxypropoxy)-5-bromo-trans-cinnamate 2.8 g (0.009 mole) of epoxide as obtained above are placed in 15 ml of isopropanol in the presence of 2.1 g (0.036 mole) of isopropylamine. This solution is refluxed for 2 hours. The solvent is removed under vacuum and the residue is taken up in 50 ml of normal HCl. The hydrochloric acid solution is washed in 50 ml of ether and made alkaline with 10 percent sodium hydroxide solution. The product precipitates in the for of white crystals melting at 110°C (Kofler). They are taken up in chloroform, the solution is dried over $Na_2SO_4$ and acidified with gaseous HCl. The hydrochloride is recrystallised in the form of white crystals melting at 156°C (Gallenkamp) with a yield of 56 percent.

| | Gravimetric analysis: | | |
|---|---|---|---|
| | $C_{16}H_{22}BrNO_4 \cdot HCl$ | $C_6H_{23}BrClNO_4$ | m.w. = 408.72 |
| | C % | H % | N % |
| calculated | 47.02 | 5.67 | 3.43 |
| found | 47.00 | 5.68 | 3.40 |

EXAMPLE 5

N-carbamimidoyl-2-(3'-isopropylamino-2'-hydroxypropoxy) trans-cinnamide

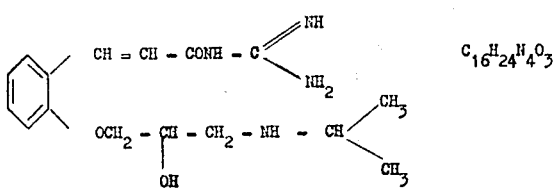

6.3 g (0.02 mole) of ortho-(3-isopropylamino-2-hydroxypropoxy) cinnamic acid hydrochloride (Example 2) are heated under reflux for 3 hours with 1.77 g (0.03 mole) of guanidine base in 20 ml of pyridine. The solution is evaporated to dryness and made alkaline with 30 percent NaOH. The oil which decants is washed with water, placed in 50 ml of methanol and dried over $Na_2SO_4$. By the action of a stream of dry hydrochloric acid gas in this solution, the hydrochloride is precipitated and this, recrystallised from methanol-ether, melts at 130°C (Gallenkamp). Yield 43 percent.

| $C_{16}H_{24}N_4O_3$ . | 2 HCl | | m.w. = 393.31 |
|---|---|---|---|
| Gravimetric analysis: | C % | H % | N % |
| calculated | 48.86 | 6.66 | 14.25 |
| found | 48.76 | 6.70 | 14.18 |

EXAMPLE 6

Methyl ortho-(3-terbutylamino-2-hydroxypropoxy) trans-cinnamate

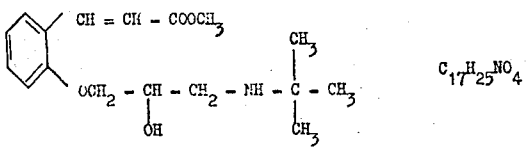

3.5 g (0.015 mole) of methyl ortho-(2,3-epoxypropoxy) trans-cinnamate, prepared as in Example 1, are placed under reflux for 2 hours with 4.4 g (0.06 mole) of terbutylamino in 25 ml of isopropanol. The excess of amine and isopropanol is then evaporated under vacuum. The residual product crystallises. Recrystallised from hexane, it melts at 106°C (Gallenkamp). The hydrochloride is prepared by a stream of gaseous hydrochloric acid on a ethereal solution of the above base. The hydrochloride obtained (4.1 g - 80%) melts at 162°C, with recrystallisation from the methanol-ether mixture.

| Gravimetric analysis: | | | |
|---|---|---|---|
| $C_{17}H_{25}NO_4$ . HCl | $C_{17}H_{26}ClNO_4$ | | m.w. = 345.84 |
| | C % | H % | N % |
| calculated | 59.38 | 7.62 | 4.08 |
| found | 59.43 | 7.64 | 4.10 |

EXAMPLE 7

Ethyl ortho-(3-isopropylamino-2-hydroxypropoxy) trans-cinnamate

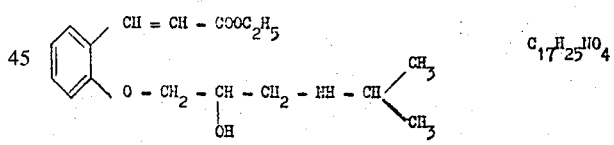

a. Preparation of the ethyl ortho-(2,3-epoxypropoxy) trans-cinnamate 17.3 g (0.09 mole) of ethyl ortho-hydroxy trans-cinnamate (m.p. 85°–87°C), 12.5 g (0.135 mole) of epichlorhydrin and 90 ml of acetone are heated for 14 hours under reflux in the presence of 15 g of pure and dry $K_2CO_3$. The acetone is evaporated under vacuum and the epoxide obtained is rectified, this distilling at 140°C/0.14 millibar. The product is obtained with a yield of 49 percent.

b. Preparation of the ethyl ortho-(3-isopropylamino-2-hydroxypropoxy) trans-cinnamate 8.4 g (0.034 mole) of the above epoxide are brought under reflux for 2 hours with 8.02 g (0.136 mole) of isopropylamine in the presence of 60 ml of isopropanol. Evaporation to dryness is carried out under vacuum on a water bath. The substance is taken up in 50 ml of normal hydrochloric acid, the solution is washed with ether and, after decantation, the aqueous solution is made alkaline. The product precipitates in the oily state and quickly crystallises. It melts at 94°C (Gallenkamp) after recrystallisation from hexane. This product is dissolved in ether and the hydrochloride is formed therefrom by a stream of gaseous hydrochloric acid. After recrystallisation from ethanol-ether, it melts at 139°C (Gallenkamp). The yield is 7.4g, i.e. 63%.

| Gravimetric analysis: $C_{17}H_{25}NO_4 \cdot HCl$ | $C_{17}H_{26}ClNO_4$ C % | H % | m.w. = 343.84 N % |
|---|---|---|---|
| calculated | 59.38 | 7.62 | 4.08 |
| found | 59.23 | 7.75 | 4.23 |

EXAMPLE 8 n-propyl ortho-(3-isopropylamino-2-hydroxypropoxy)trans-cinnamate

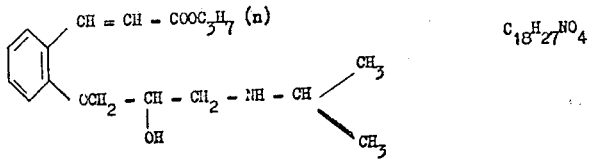

a. Preparation of the n-propyl ortho-(2,3-epoxypropoxy) trans-cinnamate 27.3 g of n-propyl ortho-hydroxy trans-cinnamate (m.p. = 70°C, Annalen 413, 266) and 185 g(0.2 mole) of epichlorhydrin are refluxed in 130 ml of acetone in the presence of 22.1 g of pure and dry $K_2CO_3$. After refluxing for 14 hours, the solvents are filtered and evaporated under vacuum. The epoxide, which has a boiling point of 153°C/0.28 mm, is rectified. 17.5 g of product, i.e. 53 percent, are obtained.

b. 18.34 g (0.07 mole) of epoxide prepared as above are refluxed for 3 hours with 16.5 g (0.28 mole) of isopropylamine in 100 ml of isopropanol. By evaporation of the amine excess and the solvent, there is obtained a white crystalline product which, after recrystallisation from hexane, melts at 85°C (Gallenkemp).

The hydrochloride is obtained by the action of gaseous hydrochloric acid on the above base, brought into solution in a mixture of ether and chloroform. After recrystallisation from isopropanol, there is obtained the corresponding hydrochloride, melting at 121°C (Gallenkamp). Yield 14 g, i.e. 50 percent.

| Gravimetric analysis: $C_{18}H_{27}NO_4 \cdot HCl$ | $C_{18}H_{28}ClNO_4$ C % | H % | m.w. = 357.87 N % |
|---|---|---|---|
| calculated | 60.41 | 7.89 | 3.91 |
| found | 60.43 | 7.86 | 3.93 |

EXAMPLE 9

Isopropyl ortho-(3-isopropylamino-2-hydroxypropoxy)trans-cinnamate:

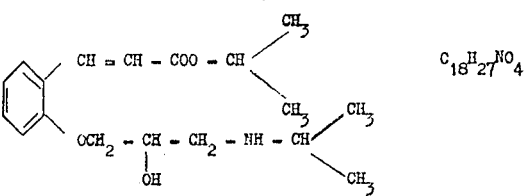

a. Isopropyl ortho-(2,3-epoxypropoxy)-cinnamate:

27.3 g (0.13 mole) of isopropyl ortho-hydroxy trans-cinnamate (m.p. = 90°C Kofler) are refluxed with 18.5 g (0.2 mole) of epichlorhydrin in 130 ml of acetone and 22.1 g (0.48 mole) of anhydrous $K_2CO_3$. After refluxing for 14 hours, the acetone is eliminated and the product is rectified. The epoxide distils at 148°C/0.15 millibar. 20 g of product are obtained, i.e. a yield of 59 percent.

b. 20 g (0.076 mole) of the epoxide described above are heated under reflux for 3 hours with 17.9 g (0.304 mole) of isopropylamine in 110 ml of isopropanol. The solvents are evaporated under vacuum on a water bath. The isopropyl ortho-(3-isopropylamino-2-hydroxypropoxy) cinnamate is obtained by being crystallised in hexane. It melts at 55°C (Gallenkamp). For obtaining its hydrochloride, the product is taken up before crystallisation in 100 ml of ether and a stream of gaseous hydrochloric acid is caused to enter this solution. The hydrochloride precipitates, it is suction-filtered, washed with ether and recrystallised from isopropanol. There are obtained 14 g of product, melting at 129°C (Gallenkamp) - yield 50 percent.

| Gravimetric analysis: $C_{18}H_{27}NO_4 \cdot HCl$ | $C_{18}H_{28}ClNO_4$ C % | H % | m.w. = 357.87 N % |
|---|---|---|---|
| calculated | 60.41 | 7.89 | 3.91 |
| found | 60.45 | 7.86 | 3.90 |

EXAMPLE 10 n-butyl ortho-(3-isopropylamino-2-hydroxypropoxy)trans-cinnamate:

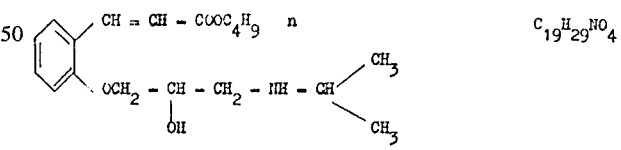

a. n-butyl ortho-(2,3-epoxypropoxy)trans-cinnamate 8.4 g (0.038 mole) of n-butyl ortho-coumarate (m.p. = 90°C Kofler) are heated under reflux for 14 hours with 5.3 g (0.057 mole) of epichlorhydrin in the presence of 6.3 g(0.045 mole) of potassium carbonate in 40 ml of acetone. The solution is filtered and the acetone is evaporated on a water bath. The epoxide in rectified. Its boiling point is 140°C/0.18 millibar-yield 6.4 g i.e. 73 percent.

b. 6.4 g (0.023 mole) of this epoxide are brought under reflux for 3 hours with 5.5 g (0.092 mole) of isopropylamine in 40 ml of isopropanol. The excess of isopropylamine and the isopropanol are distilled. The desired product crystallises. Recrystallised from hexane, it melts at 82°C (Kofler); formed into a solution in chloroform and ether, the hydrochloride is obtained therefrom by the action of gaseous hydrochloric acid. This hydrochloride, after recrystallisation from isopropanol, melts at 113°C (Gallenkamp). Yield 63 percent.

Gravimetric analysis:
$C_{19}H_{29}NO_4 \cdot HCl$

| | $C_{19}H_{30}ClNO_4$ | | m.w. = 371.89 |
|---|---|---|---|
| | C % | H % | N % |
| calculated | 61.36 | 8.13 | 3.77 |
| found | 61.35 | 8.15 | 3.70 |

What we claim is:

1. A pharmaceutical composition for the treatment of chest angina and tachyarrhythmia, comprising, as active principle, an amount sufficient to block beta-sympathetic receptors of a compound of formula

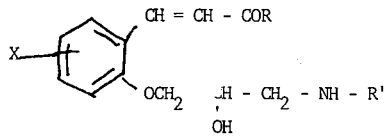

in which R is a member of the group consisting of an hydroxy, and lower alkoxy;

R' is a lower alkyl radical; and

X is hydrogen or bromine, and a physiologically acceptable pharmaceutical carrier.

2. A pharmaceutical composition according to claim 1, in the form of a pill, tablet, gelatine capsule, dragee, aqueous suspension, solution, aerosol, or syrup, containing an active principle, in accordance with claim 1, and a physiologically acceptable pharmaceutical support, wherein it permits the administration of doses of active principle which are between 20 and 1000 mg.

3. A pharmaceutical composition according to claim 1, wherein the active principle is methyl ortho-(3-isopropylamino-2-hydroxypropoxy)trans-cinnamate.

4. A pharmaceutical composition according to claim 1 in tablet form, of the formula:

| active principle | 40 mg |
|---|---|
| lactose | 182.5 mg |
| starch | 50 mg |
| gum arabic | 10 mg |
| alginic acid | 2.5 mg |
| potato starch | 12.5 mg |
| magnesium stearate | 2.5 mg |

5. A pharmaceutical composition according to claim 1, wherein the active principle is methyl ortho-(3-isopropylamino-2-hydroxypropoxy) transcinnamate hydrochloride.

6. A pharmaceutical composition according to claim 1, wherein in the active principle R is lower alkoxy, R' is isopropyl, and X is hydrogen.

7. A pharmaceutical composition according to claim 6 wherein in the active principle R is methoxy.

8. A pharmaceutical composition according to claim 6 wherein in the active principle R is ethoxy.

9. A pharmaceutical composition according to claim 6 wherein in the active principle R is propoxy or isopropoxy.

10. A pharmaceutical composition according to claim 6 wherein in the active principle R is butoxy.

11. A pharmaceutical composition according to claim 1, wherein in the active principle R' is isopropyl and X is hydrogen.

12. A pharmaceutical composition according to claim 1 wherein in the active principle R is hydroxy, R' is isopropyl and X is hydrogen.

13. A pharmaceutical composition according to claim 1 wherein in the active principle R is lower alkoxy, R' is isopropyl and X is bromine.

14. A pharmaceutical composition for the treatment of chest angina and tachyarrhythmia, comprising, as active principle, an amount sufficient to block beta-sympathetic receptors of beta-diethylaminoethyl-ortho-(3 isopropyl-amino 2-hydroxy propoxy)-transcinnamate, and a pharmaceutical carrier.

* * * * *